United States Patent

Takei

[11] Patent Number: 5,517,371
[45] Date of Patent: May 14, 1996

[54] TRACK SECTOR DETECTION SYSTEM FOR ROTATING DISK DATA STORAGE APPARATUS

[75] Inventor: Masao Takei, Hachioji, Japan

[73] Assignee: TEAC Corporation, Tokyo, Japan

[21] Appl. No.: 349,476

[22] Filed: Dec. 2, 1994

Related U.S. Application Data

[63] Continuation of Ser. No. 962,303, Oct. 16, 1992, abandoned.

[30] Foreign Application Priority Data

Oct. 18, 1991 [JP] Japan ..................... 3-298201

[51] Int. Cl.[6] ................................................. G11B 5/596
[52] U.S. Cl. ........................... 360/77.02; 360/77.02; 360/48; 360/50
[58] Field of Search ........................... 360/69, 77.05, 360/77.08, 72.2, 51, 48, 50

[56] References Cited

U.S. PATENT DOCUMENTS

| | | | |
|---|---|---|---|
| 4,636,885 | 1/1987 | Yamada et al. ............... | 360/77.08 |
| 5,027,284 | 6/1991 | Kawahara ...................... | 360/77.08 |
| 5,036,408 | 7/1991 | Leis et al. ...................... | 360/48 |
| 5,126,895 | 6/1992 | Yasuda et al. ................. | 360/77.07 |
| 5,307,218 | 4/1994 | Kitamura et al. ............... | 360/77.08 |
| 5,442,299 | 8/1995 | Emori ............................. | 360/77.08 |

*Primary Examiner*—Aristotelis Psitos
*Assistant Examiner*—James L. Habermehl
*Attorney, Agent, or Firm*—Woodcock Washburn Kurtz Mackiewicz & Norris

[57] ABSTRACT

A system for detecting the servo sectors of a rotating magnetic disk solely from read pulses representative of information read on the disk. Each servo sector has a first or intersector gap, an automatic gain control data zone, a second gap, and a track data zone. Sector pulses indicative of the servo sectors are generated when all these gaps and zones are detected. Preferably, for the production of a write enable signal, the sector pulses thus produced are further compared with window pulses obtained by imparting a prescribed delay to the sector pulses. Writing on the disk is enabled when the sector pulses agree in time with the window pulses.

8 Claims, 7 Drawing Sheets

TRACK SECTOR DETECTION SYSTEM FOR ROTATING DISK DATA STORAGE APPARATUS

This is a continuation of application Ser. No. 07/962,303, filed Oct. 16, 1992 now abandoned.

BACKGROUND OF THE INVENTION

This invention relates generally to rotating disk data storage apparatus, and particularly to that of the hard or "fixed" disk variety. More particularly, the invention deals with an improved system in such apparatus for detecting the servo sectors of tracks on the disk without relying on a disk revolution sensor such as that comprising a frequency generator.

The hard magnetic disk has a multiplicity of annular tracks arranged concentrically on at least one major surface thereof. Each track is divided into sectors each consisting of a data subsector and a servo subsector. The data subsectors are used for the storage of user information. The servo subsectors have written thereon automatic gain control (AGC) data, track data, and tracking servo patterns.

Hard disk drives usually incorporate a disk revolution sensor, as in the form of a frequency generator, which, upon rotation of the disk, produces a series of sector pulses indicative of the servo subsectors of the disk tracks. The revolution sensor is additionally used for constant speed rotation of the disk under servo control.

There are, however, some hard disk drives that dispense with a frequency generator with a view to reduction in size and cost. Such disk drives determine the servo subsectors of the rotating disk by detecting the gaps of predetermined length between the track sectors. Conventionally, errors have been almost unavoidable in such methods of sector detection based upon the intersector gaps as represented by the output waveform of the data transducer. Wrong sector pulses could make it impossible to correctly write and read data on the disk, and undesired destruction of prewritten data could also occur in writing new data.

SUMMARY OF THE INVENTION

The present invention seeks to accurately determine the track sectors of a rotating data storage disk solely from the output from the transducer.

Briefly, the invention concerns an apparatus for data transfer with a rotating disk having a multiplicity of annular tracks arranged concentrically thereon. Each track is divided into alternating servo sectors and data sectors, and each servo sector has at least a gap followed by a track data (address) zone. The apparatus comprises a transducer for data transfer with the disk, a read circuit connected to the transducer for generating read pulses representative of information read on the disk by the transducer, and a write circuit connected to the transducer for writing on the disk. The invention particularly features a sector pulse generator circuit connected between the read circuit and the write circuit for generating sector pulses upon detection of the servo sectors of each disk track on the basis of the read pulses, the sector pulses being needed to enable writing on the disk. The sector pulse generator circuit comprises first circuit means for detecting the gap of each servo sector from the read pulses, second circuit means for detecting the track data zone of each servo sector from the read pulses, and third circuit means connected to the first and the second circuit means for generating a sector pulse each time the gap and the track data zone of one servo sector are detected.

Thus, according to the invention, not only the gap but also the track data of each servo sector is relied upon for the production of sector pulses. Errors in sector detection can be drastically reduced in this manner as compared with the conventional practice of producing sector pulses upon detection of the gaps only.

Typically, each servo sector of the disk additionally comprises an automatic gain control (AGC) data zone which follows the gap and which has AGC data stored thereon, and a second gap between the AGC data zone and the track data zone. Preferably, for the detection of such servo sectors, the sector pulse generator circuit may further comprise fourth circuit means for detecting the AGC data zone of each servo sector from the read pulses, and fifth circuit means for detecting the second gap of each servo sector from the read pulses. The third circuit means may then generate a sector pulse each time the first recited gap, AGC data zone, second gap, and track data zone of one servo sector are all detected.

The invention also features a write enable circuit connected between the sector pulse generator circuit and the write circuit. The write enable circuit comprises window pulse generator circuit means for generating a series of window pulses by imparting a predetermined delay of one sector interval to the successive sector pulses, and coincidence circuit means connected to the window pulse generator circuit means for supplying a write enable signal to the write circuit, enabling writing on the disk, upon agreement in time of the sector pulses with the window pulses. More accurate writing on the disk will thus become possible, even though the sector pulses are themselves far more accurately indicative of the servo sectors than heretofore.

The above and other features and advantages of this invention and the manner of realizing them will become more apparent, and the invention itself will best be understood, from a study of the following description and appended claims, with reference had to the attached drawings showing the closest prior art and the preferred embodiments of the invention.

DESCRIPTION OF THE PREFERRED EMBODIMENT

Figure 1:
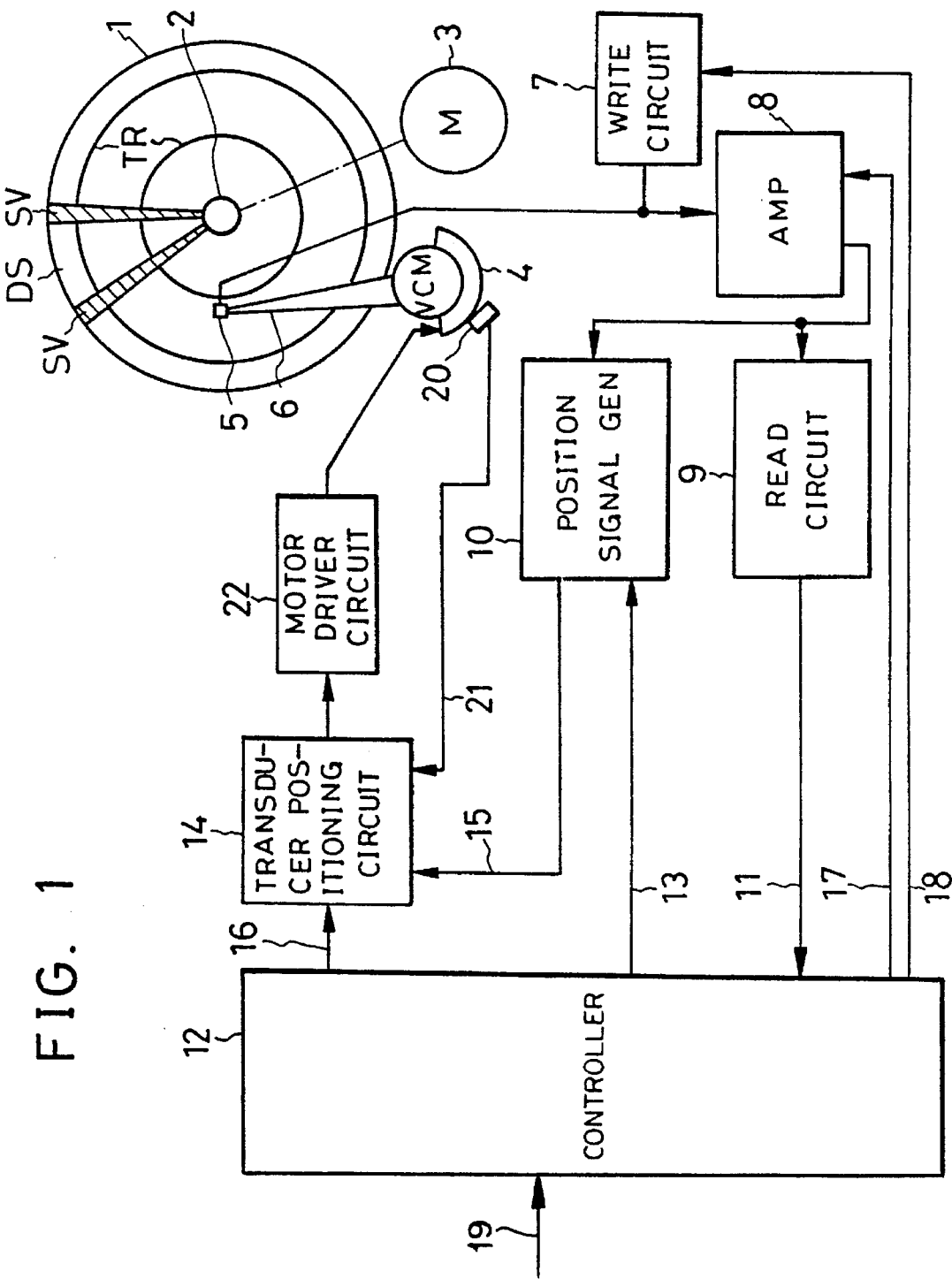
FIG. 1 is a block diagram of a hard disk drive incorporating the novel concepts of this invention.

The invention will now be described in detail as embodied in the hard disk drive illustrated in FIG. 1. The disk drive has a hard magnetic disk 1 fixed to a hub 2 which is driven directly by an electric disk drive motor 3. The disk 1 has a multiplicity of, two shown, annular record tracks TR arranged concentrically on one of its major surfaces. Data is recorded on these tracks in a prescribed format.

A magnetic data transducer 5 is mounted to a distal end of a support arm 6 which is proximally coupled to an electric transducer positioning motor 4. Typically, the positioning motor takes the form of a known voice coil motor capable of transporting the transducer 5 across the tracks TR on the disk 1 and positioning the same on any desired one of the tracks as the coil, not shown, is energized with a controlled current. The transducer 5 is electrically coupled to a write circuit 7 on one hand and, on the other hand, to an amplifier circuit 8 having an automatic gain control built into it.

All the tracks TR on the disk 1 are divided into a plurality (e.g. forty three) of sectors, and each sector is subdivided into a servo subsector SV and a data subsector DS. The servo subsectors are shown hatched for clarity. Each track is therefore divided into equal numbers of alternating servo subsectors SV and data subsectors DS.

Figure 2:
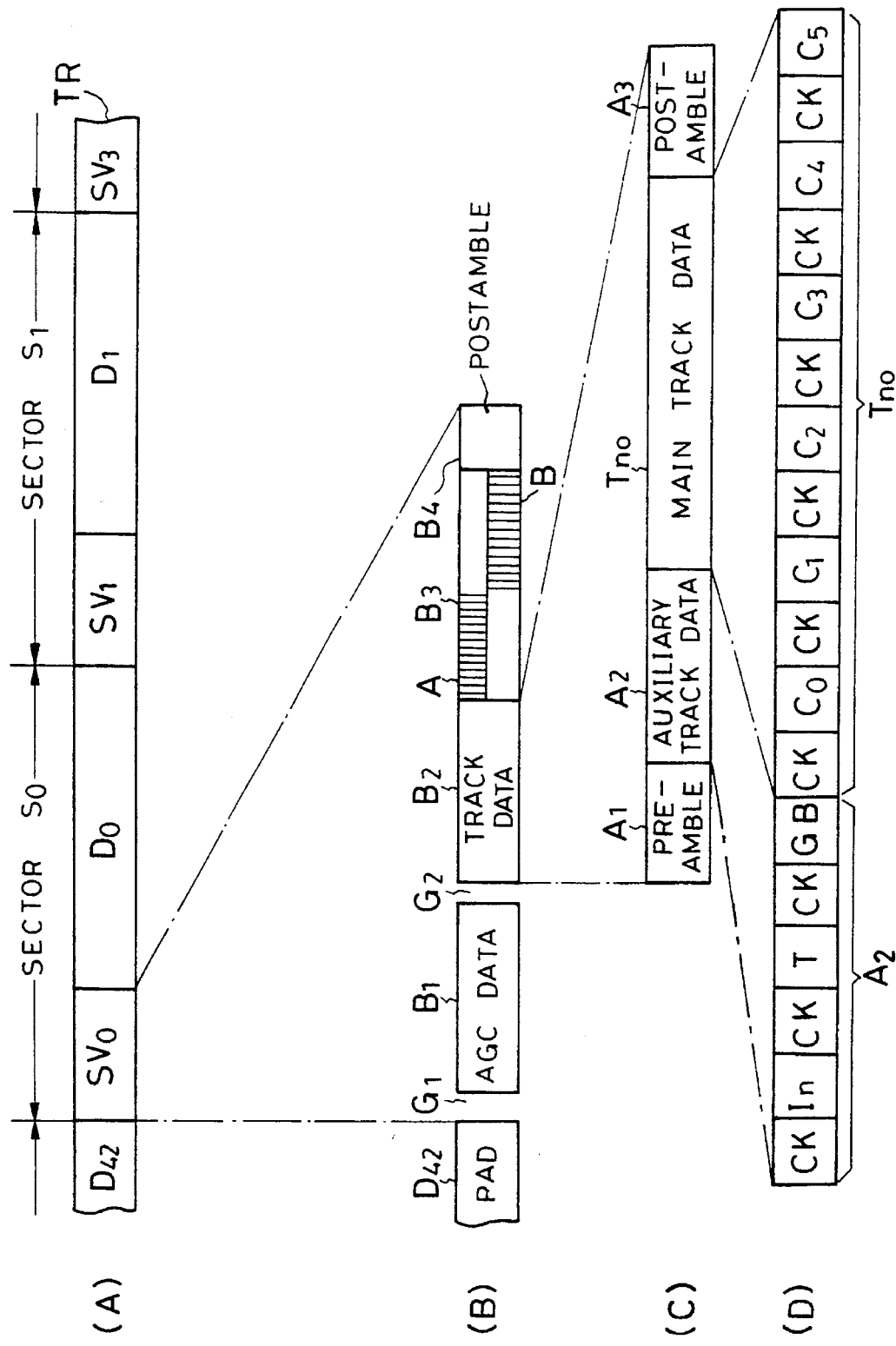
FIG. 2, consisting of (A) through (D), is a series of diagrams explanatory of the track format of the hard disk used in the FIG. 1 apparatus.

As more clearly indicated at (a) in FIG. 2, each of the track sectors $S_0, S_1, \ldots$ is subdivided into a servo subsector $SV_0, SV_1, \ldots$ and a data subsector $D_0, D_1, \ldots$ FIG. 2(B) shows that each servo subsector comprises a first or intersector gap $G_1$, an AGC data zone $B_1$, a second or mid-subsector gap $G_2$, a track data zone $B_2$, a tracking servo zone $B_3$ and a postamble $B_4$.

The illustrated intersector gap $G_1$ follows the pad, which is magnetized, at the trailing end of the data subsector $D_{42}$ of the last track sector. The length (dimension in the longitudinal direction of the track) as of the intersector gap $G_1$ is equivalent to the transfer time (two microseconds) of two bytes (16 bits) of main data on the data subsectors. The AGC data zone $B_1$ is for the storage of AGC data needed by the AGC built into the amplifier circuit 8, FIG. 1, which is coupled directly to the transducer 5. The length of this AGC data zone $B_1$ is equivalent to the transfer time (16 microseconds) of 16 bytes of main data. Disposed between AGC data zone $B_1$ and track data zone $B_2$, the mid-subsector gap $G_2$ has a length equivalent to the transfer time (one microsecond) of one byte of main data.

As will be noted from FIG. 2(D), the track data zone $B_2$ of each servo subsector comprises a preamble $A_1$, a first or auxiliary track data zone $A_2$, a second or main track data zone Tno and a postamble $A_3$. The length of the preamble $A_1$ is equivalent to the transfer time of two bytes of main data. FIG. 2(D) shows that the first track data zone $A_2$ has an index data zone In, a Track Zero detection data zone T and a guard band data zone GB, each having a length equivalent to the transfer time (0.5 microsecond) of a byte of main data. The first track data zone $A_3$ additionally comprises two noise guard zones CK, each storing a logic one, which have each a length also equivalent to the transfer time of a half byte of main data. The complete length of the first track data zone $A_2$ is therefore three microseconds.

The index data In on the first track sector $S_0$ indicates the beginning, that is, the sector $S_0$, of one track and so distinguishes the first track sector from all the other sectors $S_1-S_{42}$. The index data on the first track sector $S_0$ is a logic zero whereas the index data on the other track sectors $S_1-S_{42}$ is all logic ones.

The Track Zero detection data T is used for discriminating Track Zero from all the other tracks. Logic zeros are written on Track Zero, One, Two and Three, as well as on all the outer guard band tracks, and logic ones are written on all the other tracks. Track Zero is detected from the Track Zero detection data T combined with the main track data on the zone Tno.

The guard band data GB is for knowing the outer guard band tracks. Logic ones are written from the sixth to thirty seventh guard band tracks, and logic zeros on all the other guard bands and on all the data tracks.

As shown also at (D) in FIG. 2, the main track data Tno stores six bits of Gray code track identification data $C_0-C_5$ alternating with noise guards Ck. The length of the main track data Tn is six microseconds, each bit being a half byte long.

The postamble $A_3$ of the track data zone $B_2$ stores eight logic ones. The length of this postamble is four microseconds.

Figure 5:
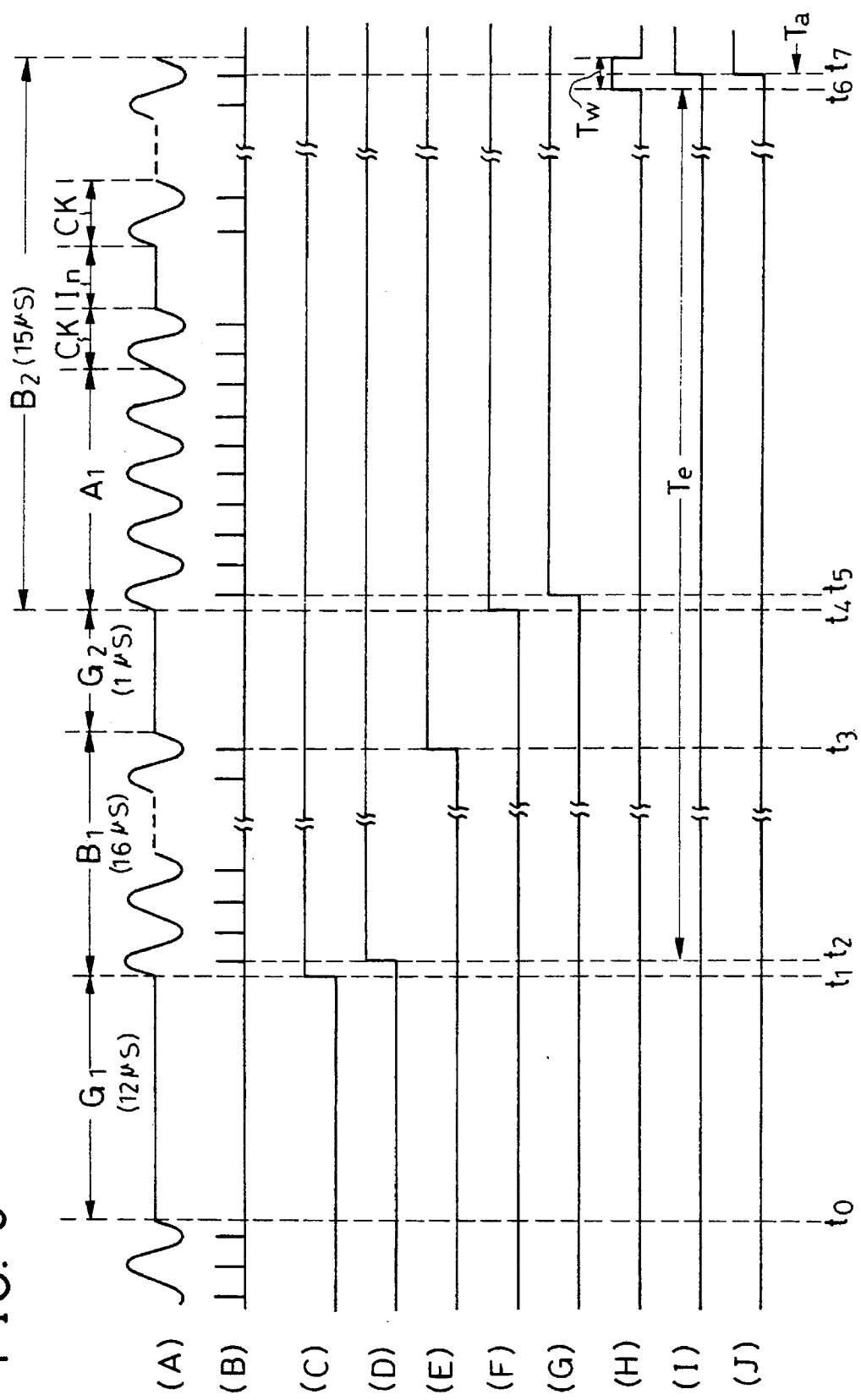
FIG. 5, consisting of (A) through (J), is a series of waveform diagrams useful in explaining the operation of the FIG. 4 sector pulse generator circuit.

FIG. 5 shows at (A) the amplified output from the transducer 5 scanning the first sector $S_0$ of Track Zero. The indicia $G_1$, $B_1$, $G_2$, $B_2$, $A_1$, CK and In seen there indicate those parts of the waveform which represent the correspondingly designated track zones of FIG. 2. The AGC data zone $B_1$ is represented by thirty two cycles of sinusoidal or semisinusoidal wave. The preamble $A_1$ of the track data zone $B_2$ is represented by four cycles of sinusoidal or semisinusoidal wave. Following the noise guard CK, which is represented by one cycle of sinusoidal wave, comes the index data In which is represented by a logic one of the same time duration as the noise guard. The remainder of the track data $B_2$ is similarly recorded and represented by the transducer output waveform.

As will be seen by referring to FIG. 2 again, each servo subsector has the tracking servo zone $B_3$ after the track data zone $B_2$, as at (B) in this figure. The tracking servo zone $B_3$ has recorded thereon servo patterns A and B offset in opposite directions from the track centerline. Then comes the postamble $B_4$ which is four microsecond long and which is represented by eight cycles of sinusoidal wave.

Each data subsector $D_0, D_1, \ldots$ contains an identification field and a data field. Main or user data is recorded on the data field.

With reference back to FIG. 1 the amplifier circuit 8 has its output coupled to a read circuit 9 and to a position signal generator circuit 10. Comprising a differentiator circuit and comparators, the read circuit 9 produces read pulses shown at (B) in FIG. 5, by detecting the peaks of the amplified transducer output waveform depicted at (A) in FIG. 5. The read pulses are sent over a line 11 to a controller 12, where the data read on the disk 1 is recreated from the read pulses.

The position signal generator circuit 10 derives the servo patterns A and B, FIG. 2(B), from the transducer output in response to a timing signal fed from the controller 12 over a line 13. Further the position signal generator circuit 10 generates a transducer position signal representative of the difference between the servo patterns A and B and sends the position signal to a transducer positioning circuit 14 over a line 15. The controller 12 is also coupled to the positioning circuit 14 by way of a line 16 for delivering thereto seek data representative of a destination track to which the transducer 5 is to be moved. The controller 12 determines the seek data on the basis of the difference between the destination track commanded by a host system, not shown, over a line 19 and the departure track which has been ascertained from the read pulses supplied over the line 11.

The controller 12 also supplies a timing signal to the amplifier circuit 8 over a line 17 for enabling the same to derive the AGC data from the zone $B_1$, FIG. 2(B), of each servo subsector. Further the controller 12 supplies a write enable signal to the write circuit 7 over a line 18.

At 20 is seen a transducer speed sensor for producing, on its output line 21 leading to the transducer positioning circuit 14, a transducer speed signal indicative of the traveling speed of the transducer 5. During track seek operation the positioning circuit 14 relies on the seek data and the transducer speed signal for causing a motor driver circuit 22 to energize the voice coil motor 4 for positioning the transducer 5 over the destination track. For tracking control the positioning circuit 14 relies on the output from the position signal generator circuit 10 in order to position the transducer 5 in centerline alignment with the destination track.

Figure 3:
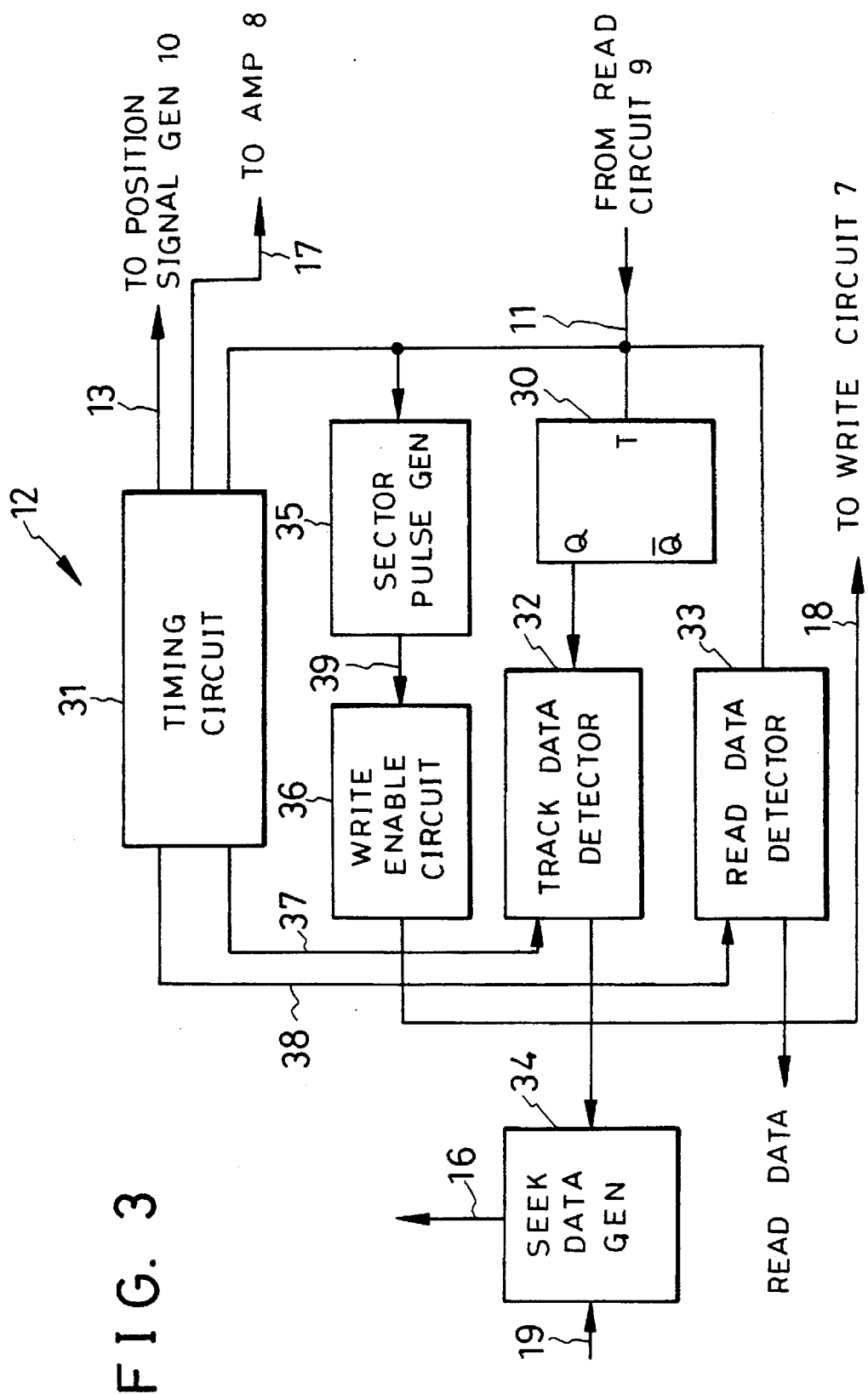
FIG. 3 is a block diagram showing in detail a controller included in the FIG. 1 apparatus.

FIG. 3 is a functional illustration of the controller 12. It is shown to comprise a trigger flip flop 30, timing circuit 31, track data detector circuit 32, read data detector circuit 33, seek data generator circuit 34, sector pulse generator circuit 35, and write enable circuit 36.

The flip flop 30 has its trigger input T connected to the read pulse line 11, so that its output changes between the two states in response to the read pulses. Having an input connected to the flip flop 30, and another input to the timing circuit 31, the track data detector circuit 32 derives the track data $B_2$, FIG. 2(B), from the read pulses. The track data is sent to the seek data generator circuit 34. The read data detector circuit 33 also has an input connected to the read pulse line 11, and another input to the timing circuit 31, deriving the main data, which has been stored on the data subsectors DS, from the read pulses.

Also connected to the read pulse line 11 is the sector pulse generator circuit 35 constituting a feature of the present invention. The sector pulse generator circuit 35 generates sector pulses by detecting the servo subsectors SV from the read pulses in accordance with the invention. The sector pulses are supplied over a line 39 to the write enable circuit 36 which forms another feature of the invention. More will be said presently about the sector pulse generator circuit 35 with reference to FIG. 4, and about the write enable circuit 36 with reference to FIG. 6.

The write enable circuit 36 internally generates window pulses for comparison with the sector pulses. Only when the sector pulses agree with the window pulses does the write enable circuit 36 supply a write enable signal to the write circuit 7 over the line 18, enabling the same to write on the disk 1.

Figure 4:
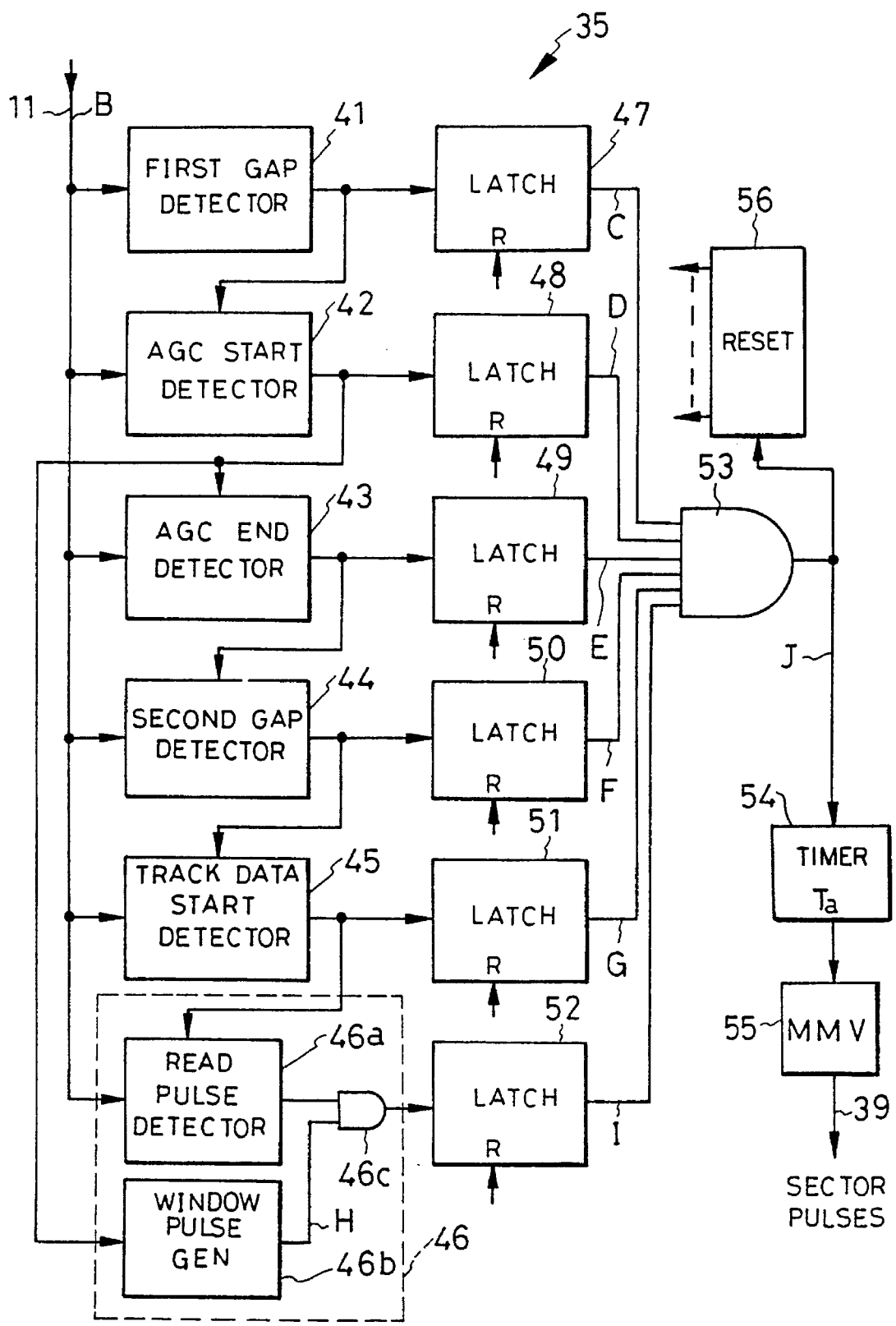
FIG. 4 is a block diagram showing in detail a sector pulse generator circuit included in the FIG. 3 controller.

Reference is now directed to FIG. 4 for the detailed discussion of the sector pulse generator circuit 35. Such discussion will be better understood by referring also to FIG. 5, which shows at (B) through (J) the waveforms appearing at those parts of the FIG. 4 circuit which are designated by like capitals. The sector pulse generator circuit 35 may be functionally described as comprising a first gap detector circuit 41, AGC data start detector circuit 42, AGC data end detector circuit 43, second gap detector circuit 44, track data start detector circuit 45, and track data end detector circuit 45, all connected to the read pulse line 11. Also included are six latch circuits 47–52 connected respectively to the noted detector circuits 41–46, an AND gate 53 having inputs connected to all the latch circuits 47–52, a timer 54 connected to the output of the AND gate 53, a monostable multivibrator (MMV) 55 connected to the timer 54, and a latch reset circuit 56 connected between the AND gate 53 and the latch circuits 47–52.

The first gap detector circuit 41 has a counter, not shown, for counting pulses generated by a clock, also not shown, in order to determine whether there is a time spacing of two microseconds between the incoming read pulses. When there is, the first gap detector circuit 41 will produce a pulse to indicate that the first or intersector gap $G_1$, FIG. 2(B), has been detected. Thus the latch circuit 47 will also go high at time $t_1$, as at (C) in FIG. 5, at the end of the first gap $G_1$.

Triggered by the output from the first gap detector circuit 41, the AGC data start detector circuit 42 determines the presence or absence of the AGC data on the basis of whether a read pulse is received within a preassigned period of time following the moment $t_1$ the first gap $G_1$ is detected. Normally, a read pulse will appear at time is immediately after the first gap detection, as at (B) in FIG. 5, so that the AGC data start detector circuit 42 will apply a pulse to the latch circuit 48 in response to this read pulse. The latch circuit 48 will then go high as at (D) in FIG. 5.

The AGC data end detector circuit 43 includes a counter, not shown, which starts counting the read pulses when triggered by the output pulse of the AGC data start detector circuit 42. Thirty two read pulses will be received if all the AGC data is read normally. Since the first of these read pulses has been received at the time $t_2$, the AGC data end detector circuit 43 ascertains whether the remaining thirty one read pulses are received within a predefined length of time thereafter. If they are, the circuit 43 will deliver a pulse to the latch 49 thereby causing the same to go high at time $t_3$, as at (E) in FIG. 5.

The second gap detector circuit 44 also includes a counter, not shown, which starts counting the read pulses in response to the output pulse of the AGC data end detector circuit 43. The second gap $G_2$, FIG. 2(B), is detected when no read pulses are received during one microsecond after the end of the AGC data at the time $t_3$. Thus the latch circuit 50 will go high at time $t_4$, as at (F) in FIG. 5.

The track data start detector circuit 45 is triggered by the output pulse of the second gap detector circuit 44 for detecting a read pulse that will appear within a prescribed length of time following the end of the second gap at the time $t_4$. Such a read pulse will do appear when the preamble $A_1$, FIG. 2(C), of the track data $B_2$ following the second gap $G_2$ is read normally. The latch circuit 51 will go high at time $t_5$, as at (G) in FIG. 5, to indicate the start of the track data $B_2$.

The track data end detector circuit 46 comprises a read pulse detector circuit 46a, window pulse generator circuit 46b, and AND gate 46c. The read pulse detector circuit 46a responds to the output pulse of the track data start detector circuit 45 for detecting the read pulses representative of the track data $B_2$. The window pulse generator circuit 46b is shown to have its input connected to the AGC start detector circuit 42. As indicated at (H) in FIG. 5, the window pulse generator circuit 46b will generate a window pulse at time $t_6$ upon lapse of a preassigned length of time Te following the detection of the AGC data start at the time $t_2$. The circuit 46b comprises a timer and an MMV, both not shown. The timer is used for measuring the time Te, which may be 31.75 microsecond, and the MMV for producing the window pulse of the duration Tw, which may be 0.25 microsecond, upon lapse of the time Te.

The AND gate 46c has two inputs connected to the read pulse detector circuit 46a and the window pulse generator circuit 46b. Therefore, when both inputs are high, the AND gate 46c will apply a pulse to the latch circuit 52 thereby causing the same to go high at time $t_7$, as at (I) in FIG. 5, and hence to indicate the end of the track data.

Receiving the outputs C–I from the latch circuits 47–52, the AND gate 53 will go high at time $t_7$, as at (J) in FIG. 5. The high output from this AND gate indicates that one servo subsector SV has been read correctly. The timer 54 will trigger the MMV 55 upon lapse of a presssigned length of time Ta after the time $t_7$ thereby causing the same to put out a sector pulse.

Figure 6:
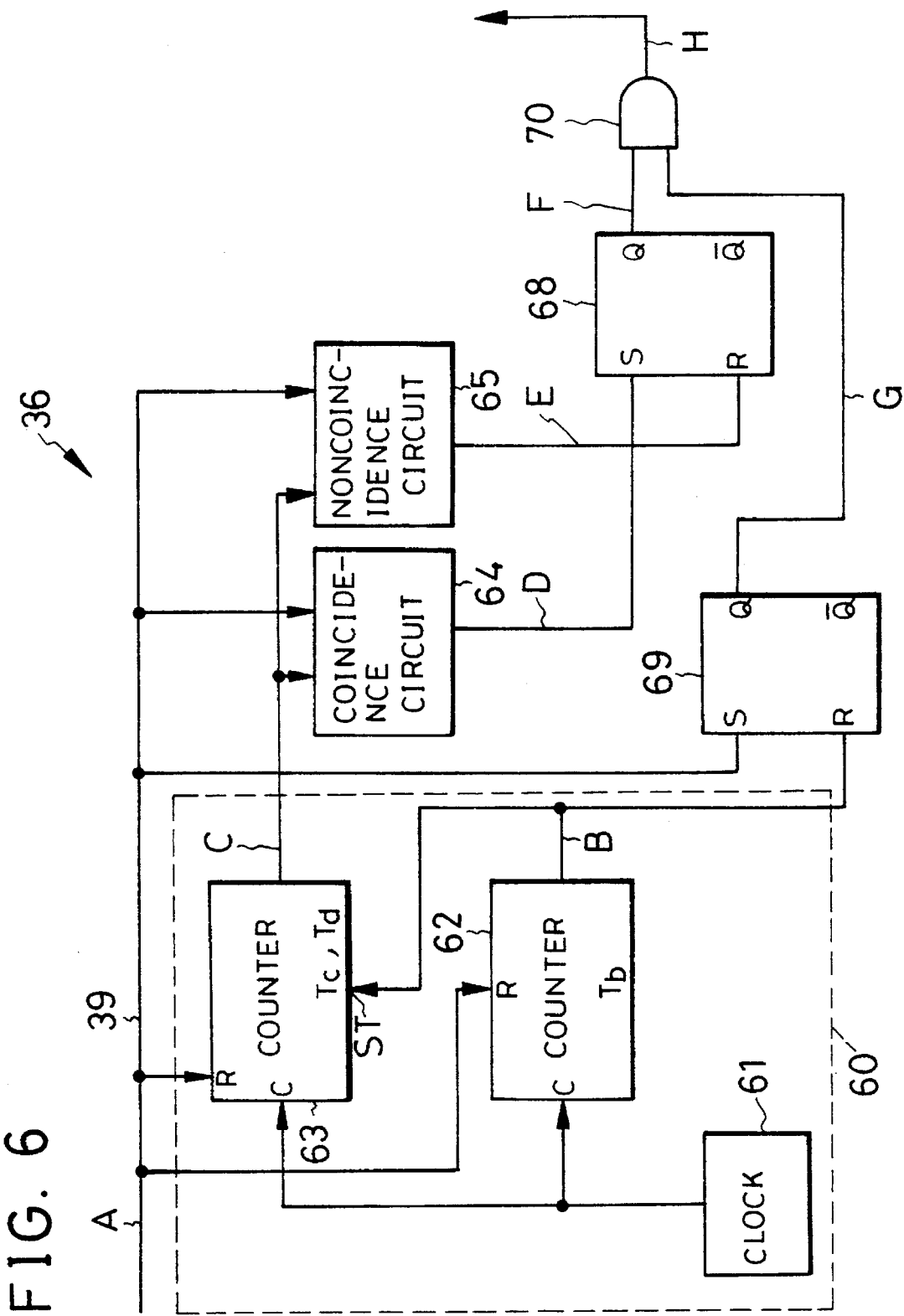
FIG. 6 is a block diagram showing in detail a write enable circuit included in the FIG. 3 a controller.
Figure 7:
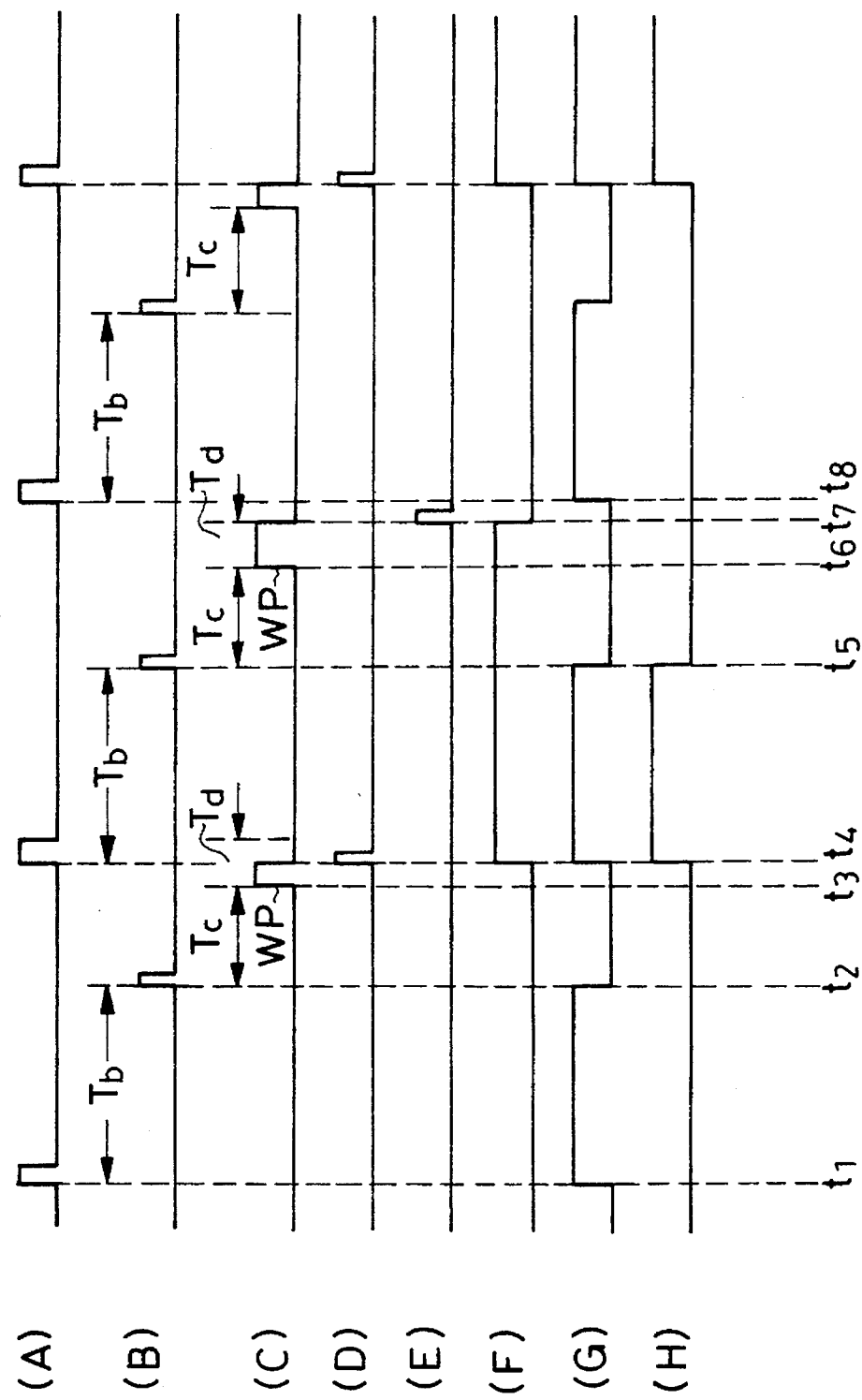
FIG. 7, consisting of (A) through (H), is a series of waveform diagrams useful in explaining the operation of the FIG. 6 write enable circuit.

The write enable circuit 36, included in the controller 12 as shown in FIG. 3, may be constructed as diagramed in FIG. 6 in order to further enhance the accuracy of servo subsector detection in accordance with the invention. FIG. 7 shows at (A) through (H) the waveforms appearing at those parts of the FIG. 6 circuit which are indicated by like capitals.

The write enable circuit 36 has a window pulse generator circuit 60 comprising a clock 61, and two counters 62 and 63 having their inputs C coupled to the clock. The first counter 62 has a reset input R coupled to the sector pulse line 39. Reset by the leading edge of each sector pulse shown at (A) in FIG. 7, the first counter 62 counts the clock pulses for a predetermined length of time Tb after time $t_1$ and puts out a pulse at time $t_2$, as at (B) in FIG. 7, which pulse is indicative of the lapse of the time Tb after the appearance of one sector pulse.

The second counter 63 has a reset input R coupled to the sector pulse line 39 and a start input ST to the first counter 62. Thus the second counter 63 starts counting the clock pulses in response to each output pulse of the first 62 and puts out one window pulse counter WP at time $t_3$, as at (C) in FIG. 7, upon lapse of a preassigned length of time Tc. Each window pulse has a predetermined duration Td.

Possibly, however, another sector pulse may be applied to the reset input R of the second counter 63 during the duration of one window pulse WP, as at time $t_4$ in FIG. 7. Thereupon the window pulse will disappear prematurely. No sector pulse is shown received during the duration of the next window pulse appearing during the $t_6$–$t_7$ time interval, so that this window pulse has the full predetermined duration Td. It is understood that the times Tb, Tc and Td are all shorter than the spacings between the sector pulses.

Also included in the write enable circuit 36 are a coincidence circuit 64 and a noncoincidence circuit 65. The coincidence circuit 64 has two inputs connected respectively to the sector pulse line 39 and to the second counter 63. As will be noted from (A) and (C) in FIG. 7, the sector pulses and the window pulses are never supplied simultaneously in this particular embodiment, so that the coincidence circuit 64 incorporates means for imparting a slight delay to each window pulse, putting out coincidence pulses, as at (D) in FIG. 7, when the delayed window pulses agree in time with the sector pulses.

The noncoincidence circuit 65 also has two inputs connected respectively to the sector pulse line 39 and to the second counter 63. As indicated at (E) in FIG. 7, the noncoincidence circuit 65 puts out non-coincidence pulses when more than a predetermined time spacing exists between the window pulses and the sector pulses, as from $t_7$ to $t_8$ in FIG. 7.

The coincidence circuit 64 is connected to the set input S of an SR flip flop 68, and the noncoincidence circuit 65 to its reset input R. Therefore, as shown at (F) in FIG. 7, the flip flop 68 is set by each coincidence pulse and reset by each noncoincidence pulse. Another SR flip flop 69 has its set input S connected to the sector pulse line 39, and its reset input R to the first counter 62. The output from this flip flop 69 is therefore as shown at (G) in FIG. 7.

The outputs from both flip flops 68 and 69 are directed into an AND gate 70. The resulting output from this AND gate, shown at (H) in FIG. 7, is the write enable signal sent to the write circuit 7 over the line 18 in order to enable writing on the disk 1.

Despite the foregoing detailed disclosure, it is not desired that the present invention be limited by the exact details of the illustrated embodiment. A variety of modifications, alterations and adaptations of the invention will suggest themselves for those skilled in the art within the broad teaching hereof. For example, although FIG. 4 shows that the sector pulses are generated when the gaps $G_1$ and $G_2$, AGC data and track data are all detected in the proper sequence, a smaller or greater number of conditions could be adopted, all that is required by the invention being that at least one gap and the track data be detected properly.

Also, in FIG. 4, the detector circuits could share some parts such as a counter, the showing of the detector circuits as being self contained being only illustrative of the principles of the invention. The components of the write enable circuit shown in FIG. 6 could similarly share many parts. It will also be apparent that the invention could be applied to magneto-optic and other types of storages.

What is claimed is:

1. In an apparatus for data transfer with a rotating disk having a multiplicity of annular tracks arranged concentrically thereon, each track being divided into alternating servo sectors and data sectors, each servo sector having a first gap, an AGC data zone which follows the first gap, a second gap which follows the AGC data zone, and a track data zone which follows the second gap, the track data zone having track data stored thereon, the improvement comprising:

(A) a transducer for data transfer with the disk;

(B) a read circuit connected to the transducer for generating read pulses representative of information read on the disk by the transfer;

(C) a write circuit connected to the transducer for writing on the disk; and (D) a sector pulse generator circuit connected between the read circuit and the write circuit for generating sector pulses representative of the servo sectors upon detection of the servo sectors of each disk track on the basis of the read pulses, the sector pulses being needed to enable writing on the disk, the sector pulse generator circuit comprising:

(a) first circuit means connected to the read circuit for detecting the first gap of each servo sector from the read pulses;

(b) second circuit means connected to the read circuit for detecting the AGC data zone of each servo sector from the read pulses;

(c) third circuit means connected to the read circuit for detecting the second gap of each servo sector from the read pulses;

(d) fourth circuit means connected to the read circuit for detecting the track zone of each servo sector from the read pulses;

(e) a first latch circuit connected to the first circuit means for holding an output of the first circuit means;

(f) a second latch circuit connected to the second circuit means for holding an output of the second circuit means;

(g) a third latch circuit connected to the third circuit means for holding an output of the third circuit means;

(h) a fourth latch circuit connected to the fourth circuit means for holding an output of the fourth circuit means;

(i) an AND gate connected to the first, the second, the third, and the fourth latch circuits for generating a sector pulse each time the first gap and the AGC data zone and the second gap and the track data zone of the one servo sector are all detected; and (j) a latch reset circuit connected between the AND gate and the first, the second, the third and the fourth latch circuits for resetting the first, the second, the third and the fourth latch circuits.

2. The invention of claim 1 further comprising a write enable circuit connected between the sector pulse generator circuit and the write circuit, the write enable circuit comprising:

(A) window pulse generator circuit means connected to the sector pulse generator circuit for generating a series of window pulses by imparting a predetermined delay to the successive sector pulses; and (B) coincidence circuit means connected to the window pulse generator circuit means for supplying a write enable signal to the write circuit, enabling writing on the disk, upon agreement in time of the sector pulses with the window pulses.

3. The invention of claim 1 wherein the sector pulse generator circuit further comprises a monostable multivibrator connected to the AND gate for generating the sector pulses.

4. In an apparatus for data transfer with a rotating disk having a multiplicity of annular tracks arranged concentrically thereon, each track being divided into alternating servo sectors and data sectors, each servo sector having a first gap, an AGC data zone which follows the first gap and which has AGC data stored thereon, a second gap following the AGC data zone, and a track data zone which follows the second gap and which has track data stored thereon, the improvement comprising:

(A) a transducer for data transfer with the disk;

(B) a read circuit connected to the transducer for generating read pulses representative of information read on the disk by the transducer;

(C) a write circuit connected to the transducer for writing on the disk;

(D) a sector pulse generator circuit connected between the read circuit and the write circuit for generating sector pulses representative of the servo sectors upon detection of the servo sectors of each disk track on the basis of the read pulses, the sector pulses being needed to enable writing on the disk, the sector pulse generator circuit comprising:

(a) first gap detector means connected to the read circuit for detecting the first gap of each servo sector from the read pulses;

(b) AGC data start detector means connected to the read circuit for detecting the start of the AGC data zone of each servo sector from the read pulses;

(c) AGC data end detector means connected to the read circuit for detecting the end of the AGC data zone of each servo sector from the read pulses;

(d) second gap detector means connected to the read circuit for detecting the second gap of each servo sector from the read pulses;

(e) track data start detector means connected to the read circuit for detecting the start of the track data zone of each servo sector from the read pulses;

(f) track data end detector means connected to the read circuit for detecting the end of the track data zone of each servo sector from the read pulses; and (g) a first latch circuit connected to the first gap detector means for holding an output of the first gap detector means;

(h) a second latch circuit connected to the AGC data start detector means for holding an output of the AGC data start detector means;

(i) a third latch circuit connected to the AGC data end detector means for an output of the AGC data end detector means;

(j) a fourth latch circuit connected to the second gap detector means for an output of the second gap detector means;

(k) a fifth latch circuit connected to the track data end detector means for holding an output of the track data detector means;

(l) a sixth latch circuit connected to the track data end detector means for holding an output of the track data end detector means;

(m) an AND gate connected to all of the first, the second, the third, the fourth, the fifth and the sixth latch circuits for generating a sector pulse each time the first gap, start and end of the AGC data zone, second gap, and start and end of the track data zone, of one servo sector are all detected in the proper sequence; and (n) a latch reset circuit connected between the AND gate and the first, the second, the third, the fourth, the fifth and the sixth latch circuit for resetting the first, the second, the third, the fourth, the fifth and the sixth latch circuits.

5. The invention of claim 4 further comprising a write enable circuit connected between the sector pulse generator circuit and the write circuit, the write enable circuit comprising:

(A) window pulse generator circuit means connected to the sector pulse generator circuit for generating a series of window pulses by imparting a predetermined delay to the successive sector pulses; and (B) coincidence circuit means connected to the window pulse generator circuit means for supplying a write enable signal to the write circuit, enabling writing on the disk, upon agreement in time of the sector pulses with the window pulses.

6. The invention of claim 4 wherein the sector pulse generator circuit further comprises a monostable multivibrator connected to the AND gate for generating the sector pulses.

7. In an apparatus for data transfer with a rotating disk having a multiplicity of annular tracks arranged concentrically thereon, each track being divided into alternating servo sectors and data sectors, each servo sector having a gap followed by a track data zone having track data stored thereon, the improvement comprising:

(A) a transducer for data transfer with the disk;

(B) a read circuit connected to the transducer for generating read pulses representative of information read on the disk by the transfer;

(C) a write circuit connected to the transducer for writing on the disk;

(D) a sector pulse generator circuit connected between the read circuit and the write circuit for generating sector pulses representative of the servo sector upon detection of the servo sectors of each disk track on the basis of the read pulses, the sector pulses being needed to enable writing on the disk, the sector pulse generator circuit comprising:

(a) first circuit means connected to the read circuit for detecting the gap of each servo sector from the read pulses;

(b) second circuit means connected to the read circuit for detecting the track data zone of each servo sector from the read pulses; and (c) third circuit means connected to the first and the second circuit means for generating a sector pulse each time the gap and the track data zone of one servo sector are detected, and (E) a write enable circuit connected between the sector pulse generator circuit and the write circuit, the write enable circuit comprising:

(a) window pulse generator circuit means connected to the sector pulse generator circuit for generating a series of window pulses by imparting a predetermined delay of one sector interval to the successive sector pulses; and (b) coincidence circuit means connected respectively to sector pulse generator circuit and to the window pulse generator circuit means for supplying a write enable signal to the write circuit, enabling writing on the disk, upon agreement in time of the sector pulses with the window pulses.

8. The invention of claim 7 wherein the window pulse generator circuit means comprises:

(a) a clock; and (b) a counter having an input coupled to the clock and a reset input coupled to the sector pulse generator circuit for generating the series of window pulses by imparting the predetermined delay of one sector interval to the successive sector pulses.

* * * * *